Oct. 30, 1928.
C. C. FARMER
1,689,233
ANGLE COCK DEVICE
Filed Oct. 17, 1927
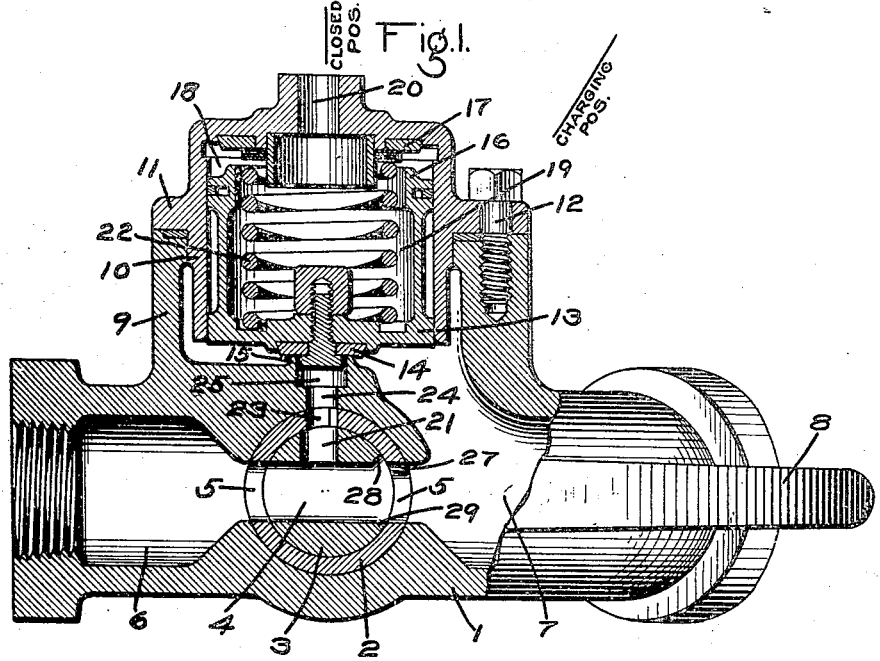
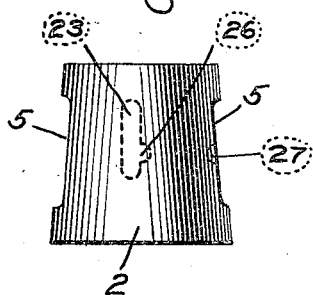
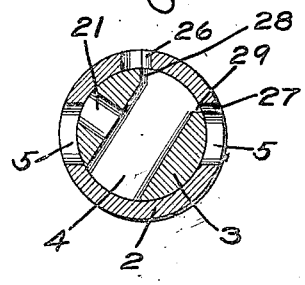
INVENTOR
CLYDE C. FARMER
BY Wm. M. Cady
ATTORNEY Patented Oct. 30, 1928.

1,689,233

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed October 17, 1927. Serial No. 226,581.

This invention relates to angle cocks such as are employed for closing the train brake pipe at each end of a car.

It has heretofore been proposed to provide a by-pass for establishing communication from one side of the angle cock key to the other, so that if the angle cock key should be accidently or maliciously turned to its closed position, communication through the brake pipe will still be maintained through the by-pass passage.

When a car having its brake pipe charged with fluid under pressure is coupled to a car in which the brake pipe is not charged, and the angle cock key is turned from its closed position to its open position, the reduction in pressure in the charged brake pipe by flow to the brake pipe on the uncharged car may be so rapid as to initiate an emergency application of the brakes.

The principal object of my invention is to provide an angle cock device having means for preventing a rapid reduction in brake pipe pressure when the angle cock on a charged car is turned to its open position.

Other objects and advantages will appear in the following more detailed description of the invention.

In the accompanying drawing; Fig. 1 is a plan view, partly in section, of an angle cock device embodying my invention; Fig. 2 a side view of the angle cock key bushing; and Fig. 3 a transverse section of the bushing and key.

In the angle cock body 1 is mounted a conical bushing 2, adapted to receive a conical cock key 3, the key having a waterway opening 4, adapted in the open position of the key to register with openings 5 in the bushing, so as to establish communication from the conduit 6 at one side of the key to the conduit 7 at the hose side of the key, the key being operated by the usual handle 8.

Mounted in a recessed extension 9 of the cock body is a sleeve 10 having a flange 11 adapted to be secured by bolts 12 to the end face of the extension. Mounted in the cylindrical bore of the sleeve is a hollow piston 13, provided at its inner end with a valve 14 adapted to engage an annular seat rib 15. A coil spring 22 acts on the piston 13 and urges the valve 14 to its seat. The opposite end of the piston 13 is provided with a seat rib 16 adapted to engage a seat 17, the piston chamber 18 and the chamber 19 within the piston being open to the atmosphere by way of port 20.

The key 3 is also provided with a port 21 which opens into and extends at a right angle from the passage 4. In the open position of the key 3, said port registers with a port 23 in the bushing, the port 23 registering with a passage 24 which opens to the chamber 25 within the seat rib 15.

The port 23 is elongated and at one side is provided with a semi-circular recess 26 and one of the openings 5 at the hose end is also provided with a semi-circular recess 27. One end of the waterway 4 is flared at 28 and 29, so that in the charging position, as shown in Fig. 3, the recesses 26 and 27 will communicate with the waterway 4.

When a car having a charged brake pipe is to be connected to a car having an uncharged brake pipe, after the hose couplings are connected, the cock key 3 on the charged car is turned from its closed position to its charging position, as shown in Fig. 3, and thus a restricted communication is established from the charged conduit 6 to the uncharged conduit 7, through opening 5 at the left, port 21, passage 4, and the recess 27. The rate of flow through the recess 27 is less than that required to effect an emergency rate of reduction in brake pipe pressure and when the pressure in conduit 7 has been increased to a predetermined degree, the pressure acting on the exposed face of piston 13 will cause the piston to be shifted to its upper position, in which the seat rib 16 engages the seat 17.

After the pressure in the conduit 7 and the uncharged section of the brake pipe has been increased to substantially that in the charged brake pipe, the handle 8 may be turned to the position in which the key 3 establishes full communication from conduit 6 to conduit 7.

If after the train is made up and the brake pipe is charged, one or more angle cocks should be turned to the closed position, either by accident or maliciously, the piston 13 will still be maintained in its outer position, so that communication from conduit 6 to conduit 7 will be maintained by way of port 21 which registers with opening 5 at the left, and the passage 4 which registers in the closed position of the cock with port 23.

The recess 26 and the flare 28 in the key 3 are provided to ensure that the key cannot be turned to some position intermediate the open and the closed position without providing communication from conduit 6 to conduit 7 by way of the by-pass passage unless the key is in such a position that there is a sufficient flow area provided directly through the key to ensure that the brakes may be controlled.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device comprising a key and having a passage for establishing communication from one side of the key to the other in the closed position of the key, communication through said passage being established through said key, and a valve for controlling communication through said passage.

2. An angle cock device comprising a key and having a passage for establishing communication from one side of the key to the other in the closed position of the key, communication through said passage being established through ports in said key, and a valve for controlling communication through said passage.

3. An angle cock device comprising a key and having a passage for establishing communication from one side of the key to the other in the closed position of the key, said key having a position intermediate the open and the closed positions, in which a restricted port opening controls the flow of fluid from one side of the key to the other.

4. An angle cock device comprising a key having a water-way adapted to establish communication from one side of the key to the other in the open position, said waterway having a port opening to one side of the key in a position intermediate the open and the closed positions and the angle cock device having a restricted port which communicates with said waterway at the other side of the key in said intermediate position.

In testimony whereof I have hereunto set my hand.

CLYDE C. FARMER.